(12) United States Patent
Ishikawa

(10) Patent No.: US 7,523,887 B2
(45) Date of Patent: Apr. 28, 2009

(54) REEL AND RECORDING TAPE CARTRIDGE

(75) Inventor: Ren Ishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 11/763,184

(22) Filed: Jun. 14, 2007

(65) Prior Publication Data

US 2007/0290090 A1 Dec. 20, 2007

(30) Foreign Application Priority Data

Jun. 20, 2006 (JP) .............................. 2006-170526

(51) Int. Cl.
*B65H 75/08* (2006.01)
(52) U.S. Cl. .................. 242/613.4; 242/348; 242/610.5
(58) Field of Classification Search .................. 242/348, 242/348.2, 609, 610, 610.4, 610.5, 610.6, 242/611, 613, 613.4; 360/132
See application file for complete search history.

(56) References Cited

U.S. PATENT DOCUMENTS

| | | | |
|---|---|---|---|
| 6,913,219 B2 * | 7/2005 | Hiraguchi et al. | 242/348 |
| 7,168,655 B2 * | 1/2007 | Morita | 242/610.4 |
| 7,300,016 B2 * | 11/2007 | Brown et al. | 242/613.4 |
| 7,347,397 B2 * | 3/2008 | Ishikawa et al. | 242/613.4 |
| 2003/0226924 A1 * | 12/2003 | Morita | 242/348 |

FOREIGN PATENT DOCUMENTS

| | | | |
|---|---|---|---|
| JP | 2004-14022 A | | 1/2004 |
| JP | 2005-116163 A | | 4/2005 |

* cited by examiner

*Primary Examiner*—William A Rivera
(74) *Attorney, Agent, or Firm*—Sughrue Mion, PLLC

(57) ABSTRACT

A resin ring is integrally formed on an outer peripheral face of a metal ring to form a hub. On a lower end portion side of the resin ring, a step portion exposing the metal ring is formed. A positioning portion with which the step portion of the hub can be fitted is formed at a central portion of a lower flange. Positions in a height direction of lower end faces of the resin ring and the metal ring are different from each other. Even if a minute gap exists between the metal ring and a metal mold for molding the hub and fluid resin flows into the gap to produce a burr, the burr does not reach the lower end face of the metal ring. Therefore, variations due to the burr do not occur in the lower end face of the hub for positioning in dimension of product.

10 Claims, 14 Drawing Sheets

REEL AND RECORDING TAPE CARTRIDGE

CROSS-REFERENCE TO RELATED APPLICATION

This application claims priority under 35 USC 119 from Japanese Patent Application No. 2006-170526, the disclosure of which is incorporated by reference herein.

BACKGROUND

1. Technical Field

The present invention relates to a reel wound with recording tape such as magnetic tape and a recording tape cartridge.

2. Related Art

As an external recording medium for a computer or the like, a recording tape cartridge formed by housing a reel wound with magnetic tape in a case is known, for example. The reel includes a hub forming an axial center portion and wound with the magnetic tape around its outer periphery and an upper flange and a lower flange extending radially outward from axial opposite ends of the hub, respectively.

Conventionally, there is a known recording tape cartridge formed by winding recording tape such as magnetic tape on a single reel and rotatably housing the reel in a case made of synthetic resin, the tape used as a data recording and playback medium for a computer or the like. At a tip end (free end) of this recording tape, a leader member such as a leader pin, a leader tape, and a leader block is provided. A pull-out means provided to a drive device pulls out the leader member from an opening of the recording tape cartridge to thereby wind the recording tape fixed to it around a winding reel of the drive device.

In such a reel of the recording tape cartridge, the recording tape is normally wound around an outer peripheral face of its hub. An upper flange and a lower flange are provided above and below the hub, respectively. With the upper and lower flanges, the recording tape is restricted in its vertical height position, held to enhance a roll appearance and to improve traveling stability, and moreover protected from excessive damage when the tape is not in use.

Meanwhile, in many cases, the hub is formed into a cylindrical shape which has a bottom and in which axial one side is opened and the other side is closed. The hub in such a cylindrical shape with the bottom is likely to be deformed on its open end side having lower strength due to winding pressure of the magnetic tape. If the hub is deformed in this manner, the flange provided on the open end side of the hub is deformed in such a direction as to come in contact with a widthwise end portion (edge) of the magnetic tape.

Therefore, a configuration for reinforcing the hub with a metal ring so as to prevent deformation of the hub is conceivable as in Japanese Patent Application Laid-open (JP-A) No. 2004-14022 and JP-A No. 2005-116163, for example. However, in covering an outer peripheral face of the metal ring with resin and integrating the metal ring and resin with each other by insert molding, fluid resin may flow into a minute gap (of several tens of microns) existing between the metal ring and a metal mold in molding to thereby produce a resin burr on an end face of the metal ring and the burr causes variations in heights of hubs in dimensions of products.

SUMMARY

With the above facts in view, the present invention provides a reel and a recording tape cartridge without variations due to a burr on an end face of a hub in dimensions of products.

A first aspect of the present invention is a reel including: a hub on which a recording tape is wound; an upper flange provided at one end portion of the hub so as to hold one widthwise end portion of the recording tape; and a lower flange provided at the other end portion of the hub so as to hold the other widthwise end portion of the recording tape in cooperation with the upper flange, wherein: the hub is structured to include a tube shaped reinforcing ring and a resin ring integrally formed on an outer peripheral face of the reinforcing ring, a step portion is formed along a circumferential direction between a lower face of one end portion at the lower flange side of the resin ring and a lower face of one end portion at the lower flange side of the reinforcing ring so as to expose the reinforcing ring, and a mount portion is formed along the circumferential direction at the lower flange such that the step portion is able to fit with the mount portion.

According to the first aspect of the invention, the resin ring is integrally formed on the outer peripheral face of the cylindrical reinforcing ring, and the step portion is formed at one end portion side of the resin ring (at one end portion side of the hub) along the circumferential direction to expose the reinforcing ring. On the other hand, the mount portion is formed along the circumferential direction at the lower flange such that the step portion is able to fit with the mount portion.

In integrally molding the reinforcing ring and the resin ring, the minute gap exists between the reinforcing ring and the metal mold in molding and fluid resin from a space portion of the metal mold corresponding to the resin ring may flow into the gap to thereby produce a resin burr on an end face of the reinforcing ring. By forming the step portion for exposing the reinforcing ring at one end portion side of the resin ring, positions in a height direction of the end face of the resin ring and the end face of the reinforcing ring are displaced from each other. In this way, even if the fluid resin from the space portion of the metal mold corresponding to the resin ring flows to the reinforcing ring, the fluid resin does not reach the end portion of the reinforcing ring. In other words, variations due to the burr do not occur in the end face of the hub for positioning in dimension of product.

The mount portion is formed along the circumferential direction at the lower flange such that the step portion is able to fit with the mount portion. As a result, the step portion does not exist seemingly on the surface of the hub of the assembled reel. In other words, a face to be wound with the recording tape is flat so as not to affect the recording tape to be wound.

A second aspect of the invention is a reel according to the first aspect in which the step portions are provided intermittently along the circumferential direction, and the mount portions are provided intermittently along the circumferential direction.

According to the second aspect of the invention, by intermittently providing the step portions and the mount portions along the circumferential direction, it is possible to prevent rotation of the hub with respect to the flange.

A third aspect of the invention is a reel according to the first or second aspect and further including: a plurality of lower ribs formed to stand on an upper face of the lower flange, and arranged along the circumferential direction, the hub being able to fit over the lower ribs; and a plurality of upper ribs hanging down from a lower face of the upper flange to correspond to the lower ribs, and arranged along the circumferential direction, the hub being able to fit over the upper ribs, wherein end faces of the lower ribs and end faces of the upper ribs are welded so as to sandwich the hub between the upper flange and the lower flange.

According to the third aspect of the invention, plural lower ribs are formed to stand on an upper face of the lower flange, and arranged along the circumferential direction, and plural upper ribs hangs down from a lower face of the upper flange to correspond to the lower ribs, and arranged along the circumferential direction. The end faces of the lower ribs and end faces of the upper ribs are welded so as to sandwich the hub between the upper flange and the lower flange.

In other words, by directly welding the upper flange and the lower flange via the upper ribs and the lower ribs, the upper flange, the lower flange, and the hub are integrated with each other by the hub being sandwiched between the upper flange and the lower flange. In other words, because the hub is not directly welded to the upper flange and the lower flange, it is possible to prevent transmission of a winding and tightening force of the recording tape acting on the hub to the upper flange and the lower flange. As a result, it is possible to prevent deformation of the upper flange and the lower flange.

A fourth aspect of the invention is a reel according to any one of the first to third aspects in which a connection portion which covers an end portion at the upper flange side of the reinforcing ring and is continuous to the resin ring is provided, and a rib which is continuous to the connection portion is formed on an inner peripheral face of the reinforcing ring.

According to the forth aspect of the invention, the connect portion covers the end portion at the upper flange side of the reinforcing ring and is continuous to the resin ring. Moreover, the rib continuous to the connect portion is formed on the inner peripheral face of the reinforcing ring. By forming the rib in this manner, it is possible to reinforce the hub. It is also possible to provide a gate as an injection port of the resin material in molding at a space portion of the metal mold which space corresponds to the rib.

In this case, after inserting the reinforcing ring in the metal mold for molding the hub, the resin is filled into a space formed in the metal mold via the gate. In other words, the resin flows from a space portion for forming the rib into a space for forming the resin ring via a space for forming the connect portion to thereby integrate the reinforcing ring and the hub.

A fifth aspect of the invention is a reel according to the first aspect in which the step portion is provided along the circumferential direction throughout the circumference of the hub, and the mount portion is provided along the circumferential direction throughout the circumference of the hub.

A sixth aspect of the invention is a reel according to the first aspect in which the mount portion is provided by forming a concave portion on an upper surface of the lower flange.

A seventh aspect of the invention is a reel according to the first aspect in which the step portion is formed by positioning the lower face of the one end portion at the lower flange side of the resin ring further toward the upper flange side than the lower face of the one end portion at the lower flange side of the reinforcing ring.

An eighth aspect of the invention is a reel according to the sixth aspect in which the lower face of the one end portion at the lower flange side of the resin ring surface-contacts the lower flange at an outer side portion in a radius direction with respect to the concave portion at the upper surface of the lower flange.

A ninth aspect of the invention is a reel according to the second aspect in which an engaging portion is provided between the step portions that are adjacent to each other along the circumferential direction, and a groove portion which is able to fit with the corresponding engaging portion is formed between the mount portions that are adjacent to each other along the circumferential direction.

A tenth aspect of the invention is a recording tape cartridge including a reel and a case that accommodates the reel, the reel including: a. hub on which a recording tape is wound; an upper flange provided at one end portion of the hub so as to hold one widthwise end portion of the recording tape; and a lower flange provided at the other end portion of the hub so as to hold the other widthwise end portion of the recording tape in cooperation with the upper flange, the hub being structured to include a tube shaped reinforcing ring and a resin ring integrally formed on an outer peripheral face of the reinforcing ring, a step portion being formed along a circumferential direction between a lower face of one end portion at the lower flange side of the resin ring and a lower face of one end portion at the lower flange side of the reinforcing ring so as to expose the reinforcing ring, and a mount portion being formed along the circumferential direction at the lower flange such that the step portion is able to fit with the mount portion.

With the above configuration of the invention, variations due to the burr do not occur in the end face of the hub in dimension of product.

BRIEF DESCRIPTION OF THE DRAWINGS

Exemplary embodiments of the invention will be described in detail with reference to the following figures, wherein.

DETAILED DESCRIPTION

Figure 1:
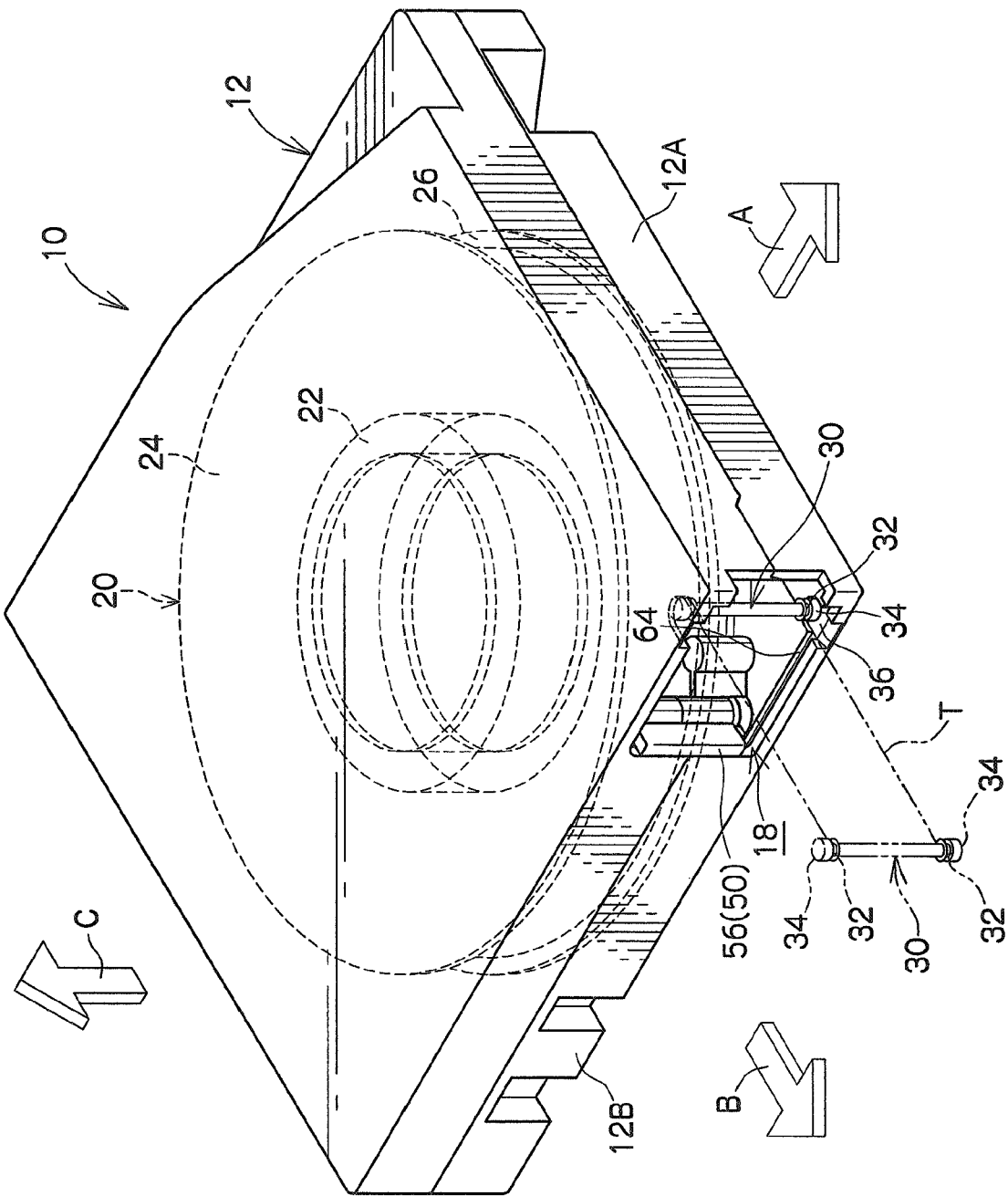
FIG. 1 shows an exploded perspective view of a general configuration of a recording tape cartridge according to an exemplary embodiment of the present invention.

Hereafter, embodiments of the present invention will be described in detail based on the examples shown in the drawings. For ease of explanation, in FIG. 1, the loading direction for a recording tape cartridge 10 to a drive device is indicated with the arrow marked "A", which is the front direction (i.e., front side) of the recording tape cartridge 10. The direction of the arrow marked "B" that is perpendicular to the arrow A is the direction to the right (i.e., right side).

Figure 2:
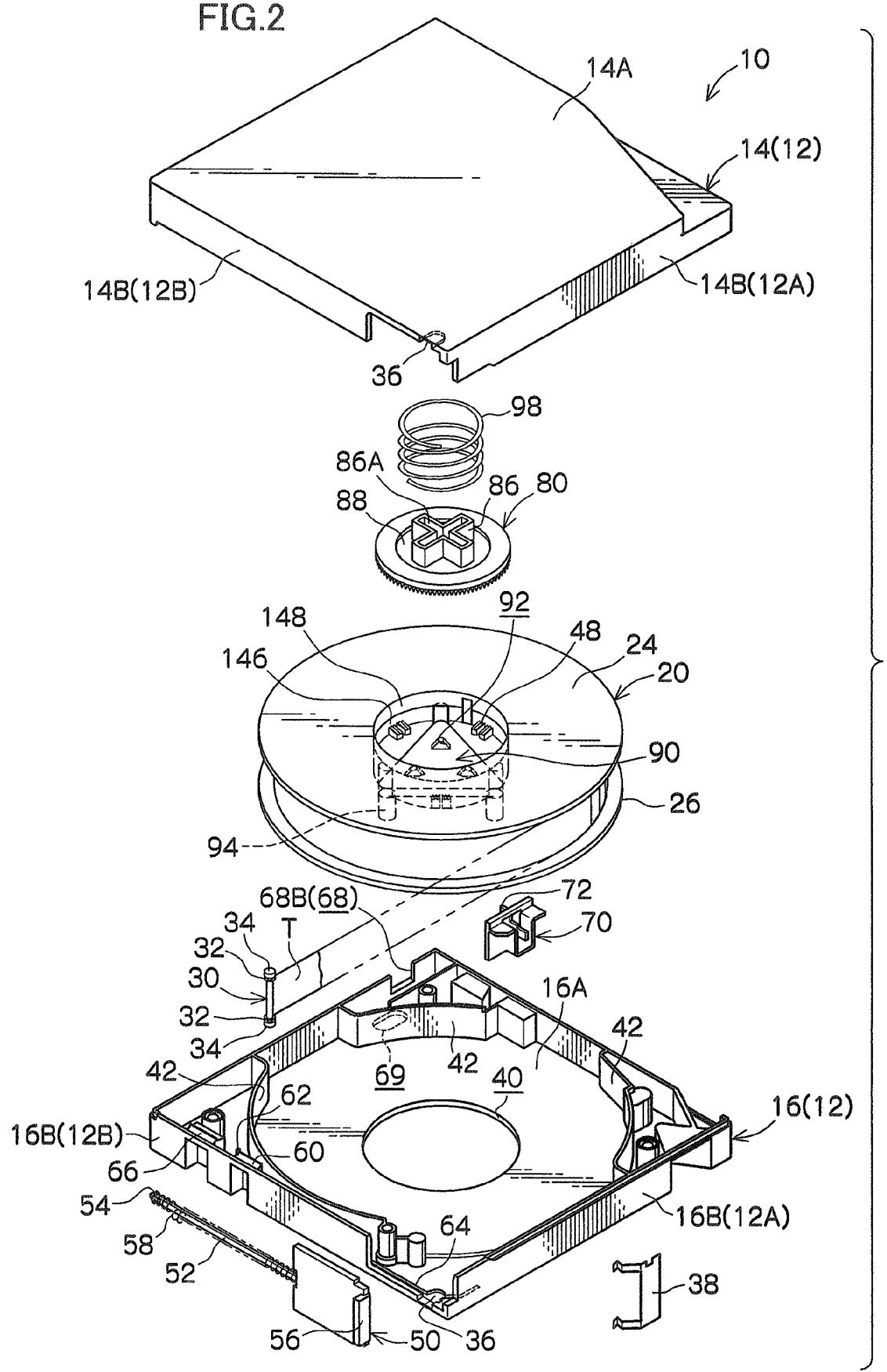
FIG. 2 shows a schematic exploded perspective view of the recording tape cartridge according to the exemplary embodiment of the invention when it is viewed from above.
Figure 3:
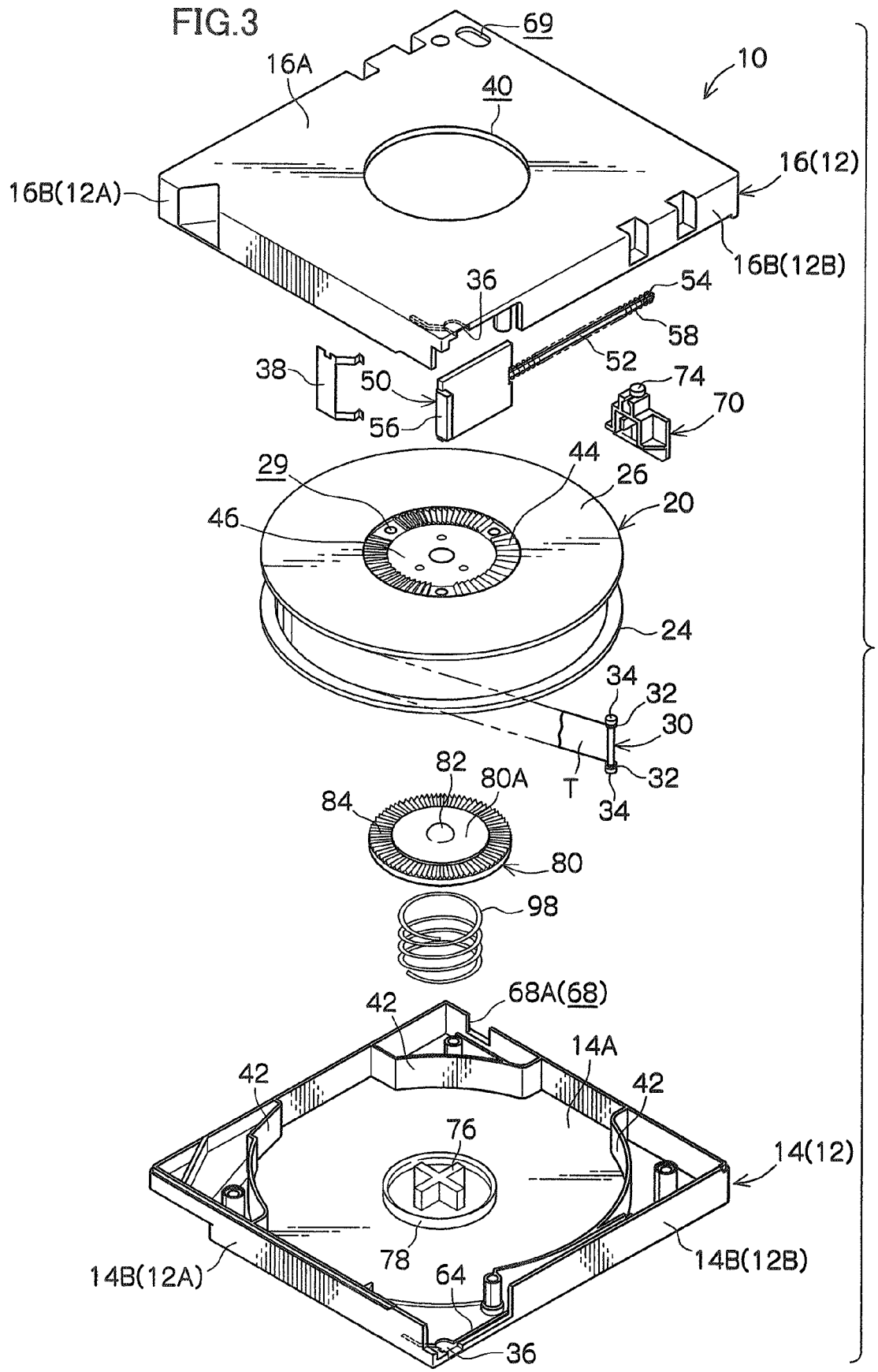
FIG. 3 shows a schematic exploded perspective view of the recording tape cartridge according to the exemplary embodiment of the invention when it is viewed from below.

As shown in FIGS. 1-3, the recording tape cartridge 10 has a substantially rectangular box-shaped casing 12. This casing 12 includes a top casing 14 and a bottom casing 16 made from a resin of polycarbonate (PC) and the like. A peripheral wall 14B provided so as to extend from the peripheral edge of a top panel 14A and a peripheral wall 16B provided so as to extend from the peripheral edge of a bottom panel 16A are in a state where these are each brought into contact with each other. These are configured to be joined by means such as supersonic wave adhesion or screws and the like.

Figure 4:
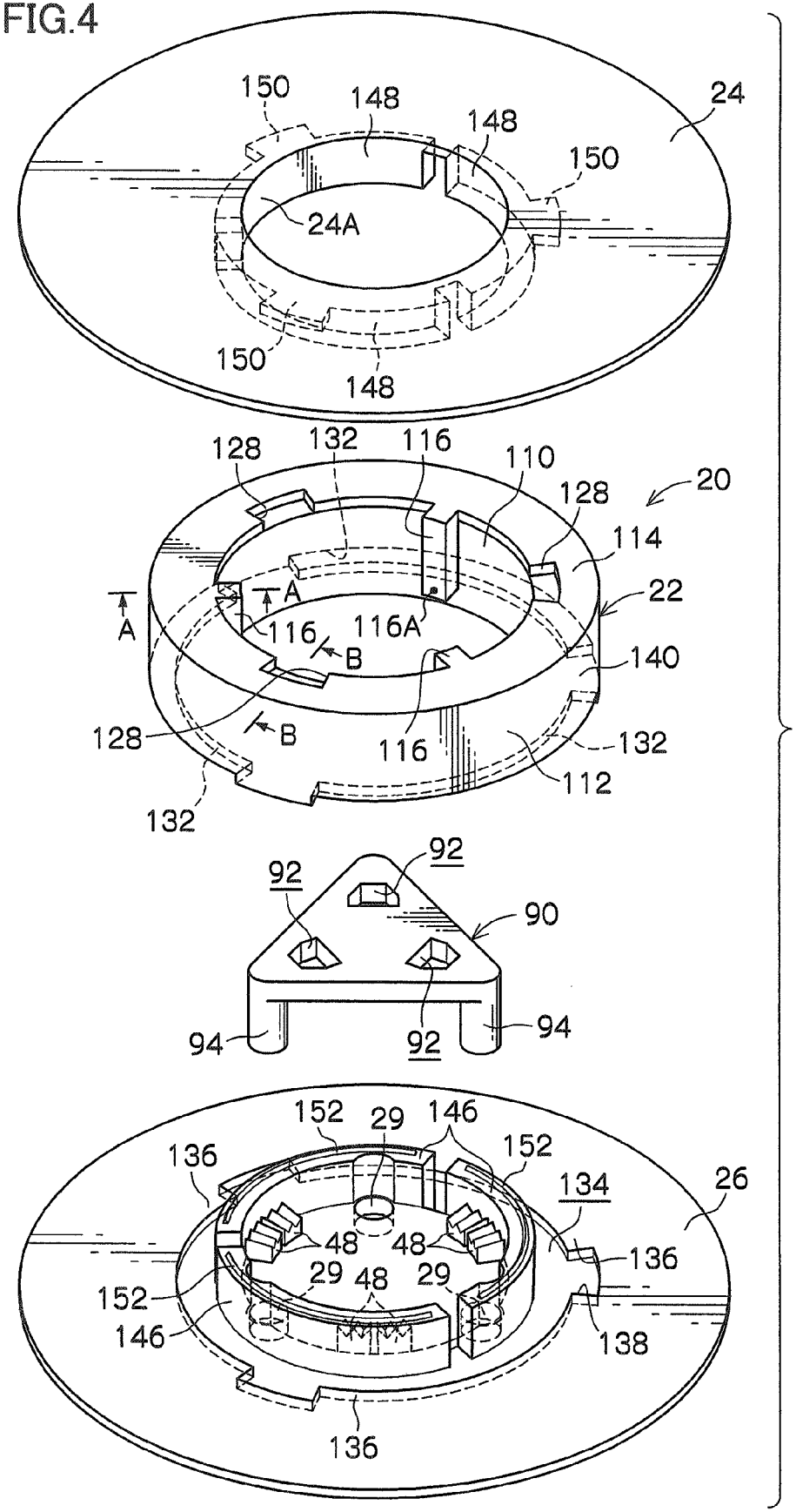
FIG. 4 shows a schematic exploded perspective view of a reel according to the exemplary embodiment of the invention.

In the casing 12, only one reel 20 is housed rotatably. As shown in FIG. 4, the reel 20 is formed of a substantially cylindrical hub 22 forming an axial center portion, a substantially disk-shaped lower flange 26 provided to a lower end portion of the hub 22, and an annular upper flange 24 provided to an upper end portion of the hub 22, each of which is formed from resin (e.g., polycarbonate including 10% of glass-reinforced fiber). On the hub 22, an aluminum metal ring 110 (reinforcing ring) is formed integrally with resin.

Recording tape T such as magnetic tape as an information recording and playback medium is wound around an outer peripheral face of the hub 22 and widthwise end portions of the wound recording tape T are held by the upper flange 24 and the lower flange 26.

Figure 5:
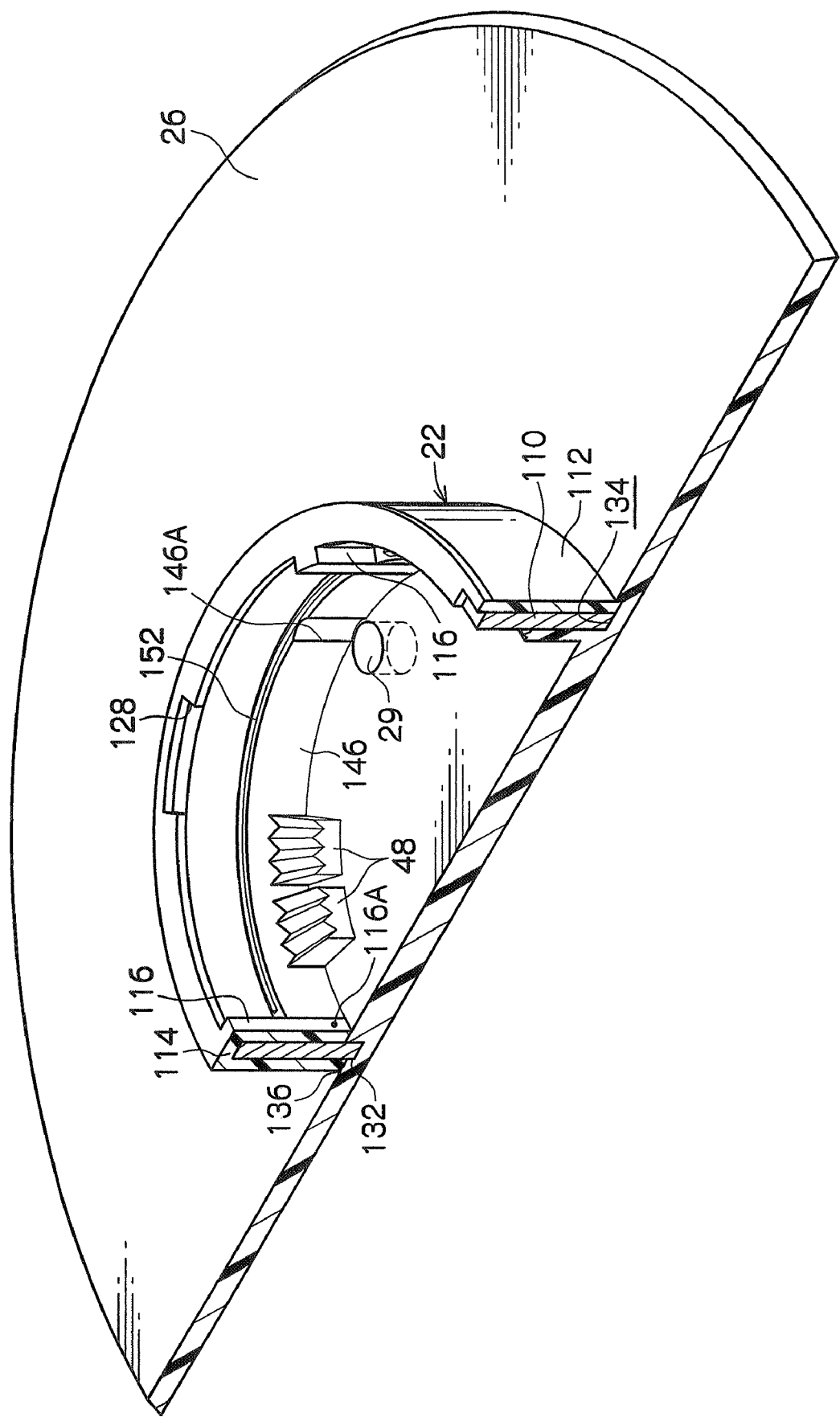
FIG. 5 shows a schematic sectional view of a lower flange and a hub of the reel according to the exemplary embodiment of the invention.
Figure 6:
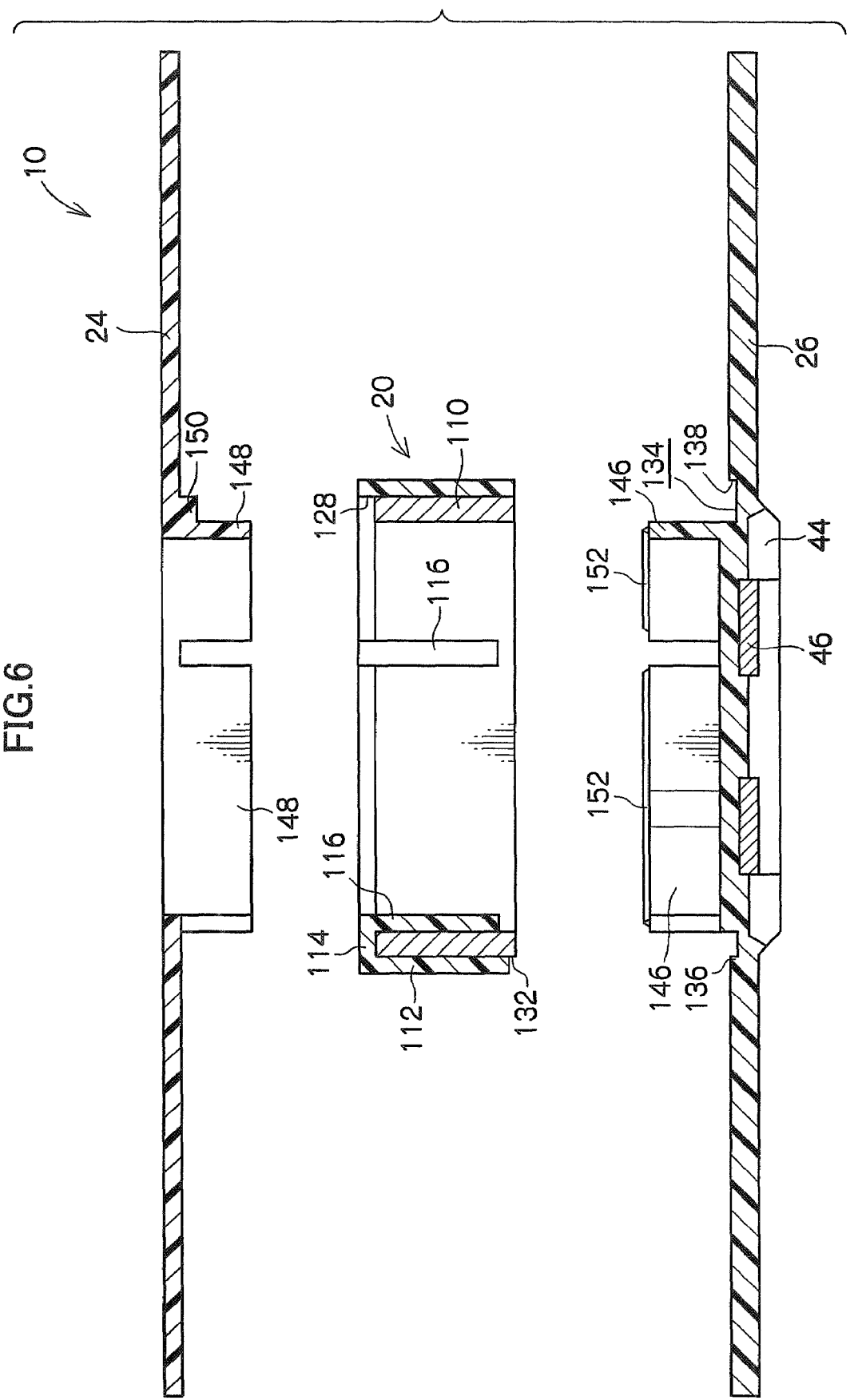
FIG. 6 shows a schematic exploded sectional view of the reel according to the exemplary embodiment of the invention.
Figure 7:
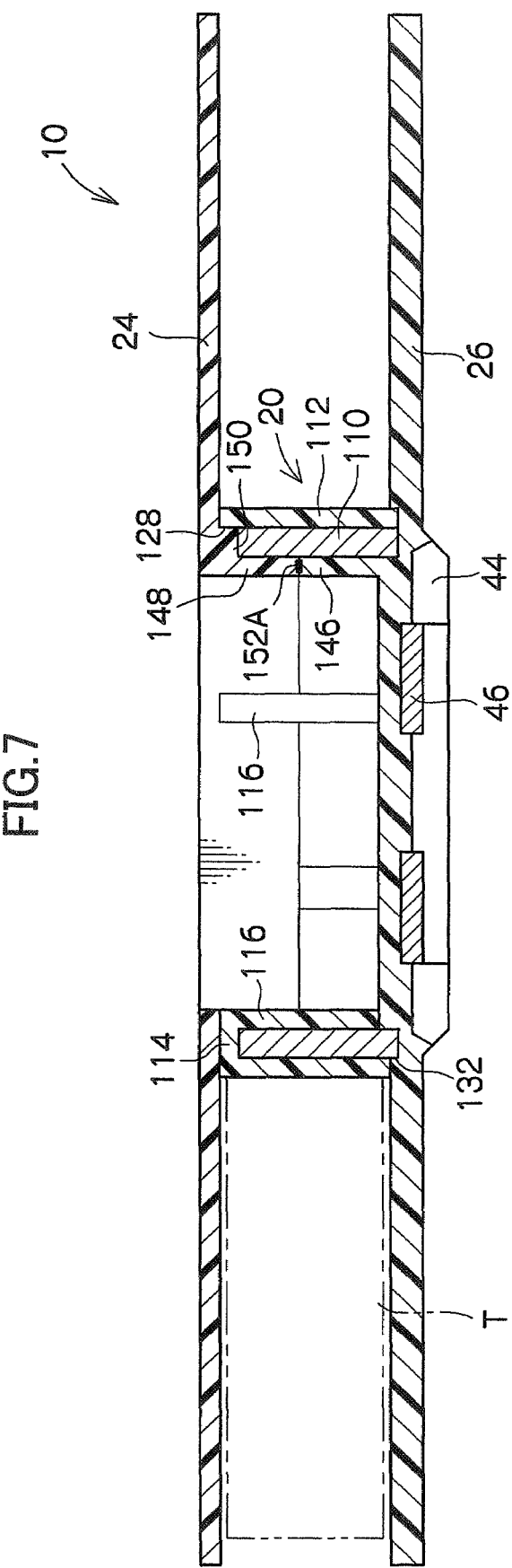
FIG. 7 shows a schematic sectional view of the reel according to the exemplary embodiment of the invention.

Here, the reel 20 will be described. As shown in FIGS. 5 to 7, the metal ring 110 of a wall thickness of about 1.25 mm is provided on an inner side of the hub 22 and a resin portion 112 (hereafter referred to as "resin ring 112") of a wall thickness of about 1.0 mm is provided on an outer side of the hub 22. On an inner side of the metal ring 110, three gate ribs 116 (ribs) each substantially in a shape of a rectangular parallelepiped having a width of about 2 mm are formed along an axial direction of the hub 22 and provided at equal intervals along a circumferential direction of the hub 22. In this way, it is possible to reinforce the hub 22.

At the gate rib 116, a gate mark due to a gate 116A which is used as an injection port for resin material in molding (forming) of the hub 22 is formed. At an upper end face of the hub 22, a resin portion 114 (contiguous portion) having a wall thickness of about 0.8 to 1.0 mm throughout a circumference of the hub 22 is formed, the resin portion 114 contiguous to the gate ribs 116.

Figure 9:
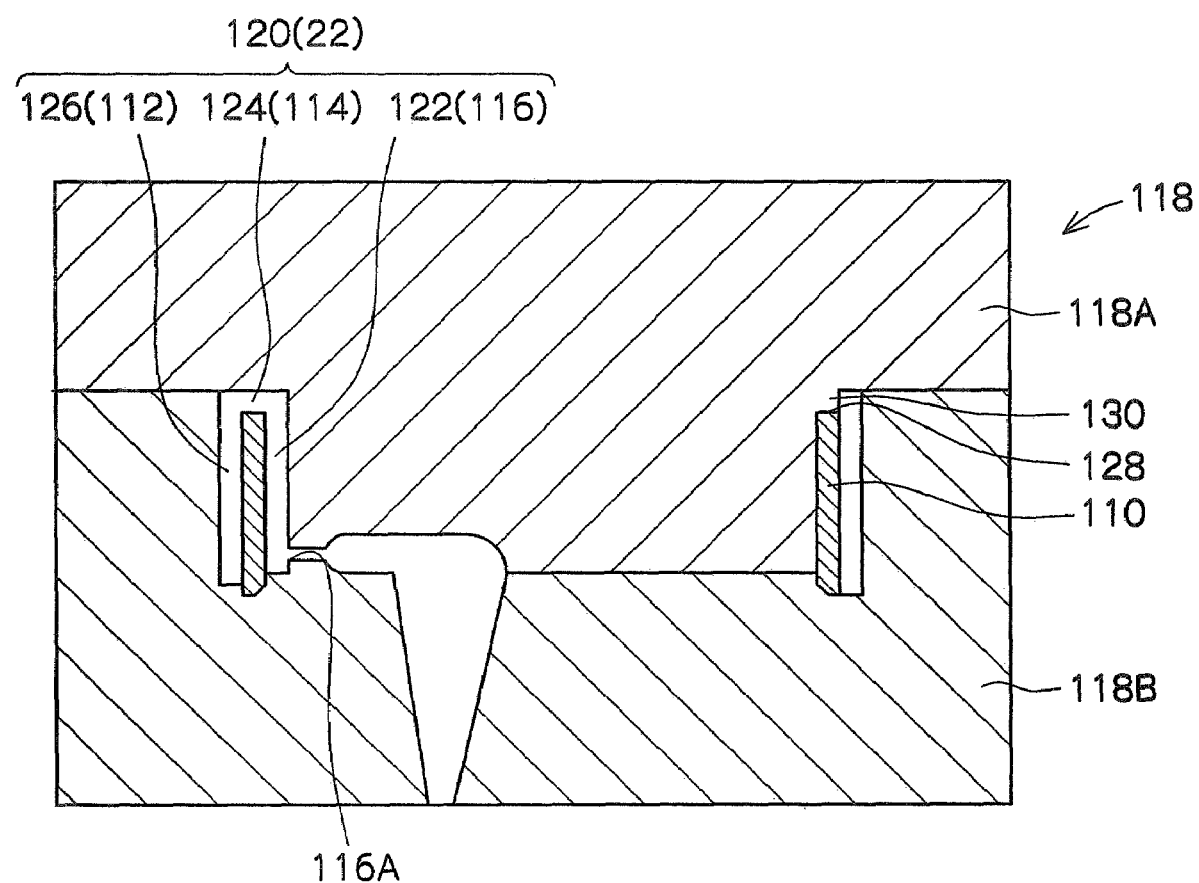
FIG. 9 shows a schematic sectional view of a metal mold for forming the hub of the reel according to the exemplary embodiment of the invention and showing a closed state of the mold.

As shown in FIG. 9, after the metal ring 110 is inserted into a metal mold 118 for molding the hub 22, resin is filled into a space 120 formed by the metal mold 118 via the gate 116A. In other words, in the invention, the resin flows from a space 122 for forming the gate rib 116 into a space 126 for forming the resin ring 112 via a space 124 for forming the resin portion 114 to integrally form the metal ring 110, the resin portion 114, and the resin ring 112.

Here, on a lower end portion side of the resin ring 112, step portions 132 at which the metal ring 110 exposes are formed intermittently along a circumferential direction of the resin ring 112. In the step portion 132, a height difference of about 0.1 to 5.0 mm and preferably about 0.5 mm is present from a lower end face of the metal ring 110 to a lower end face of the resin ring 112.

Figure 8:
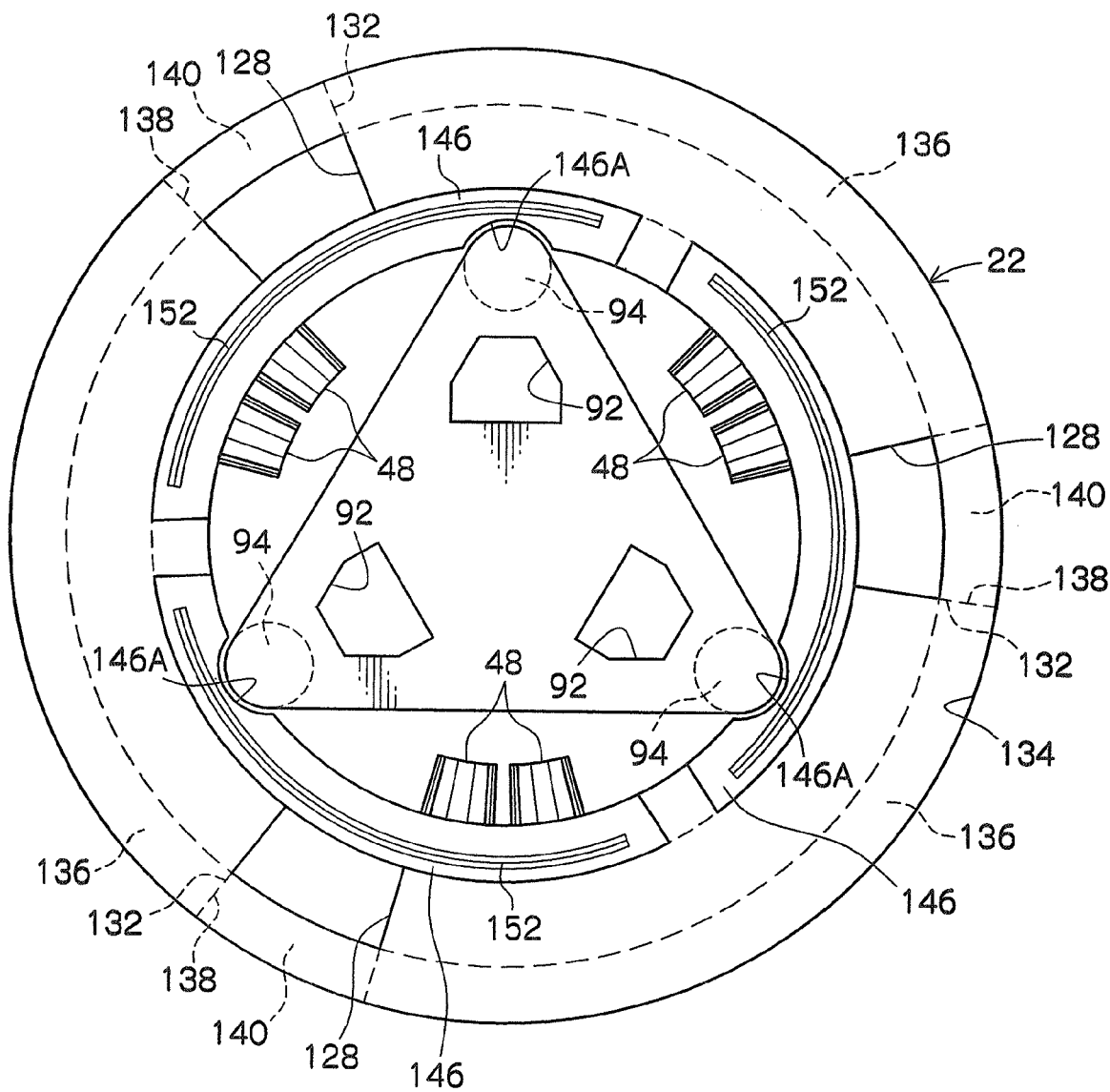
FIG. 8 shows a cross-sectional view of the reel according to the exemplary embodiment of the invention.

On the other hand, as shown in FIGS. 4 and 8, a substantially circular cylindrical recessed portion 134 is formed at a central portion of the lower flange 26 in a concentric circle manner. Positioning portions 136 with which the step portions 132 of the hub 22 can be fitted respectively are provided as "mount portions" at step portions between the recessed portion 134 and an outer side portion in a radius direction with respect to the recessed portion 134 at the upper surface of the lower flange 26 (that is, the step portions is in the vicinity of outer peripheral portions of the recessed portion 134).

A length of the positioning portion 136 along the circumferential direction of the lower flange 26 is set to be substantially the same as a length of the step portion 132 along the circumferential direction of the hub 22, and a height of the positioning portion 136 (a height of the recessed portion 134) is set to be substantially the same as the height of the step portion 132, so that the lower face of the one end portion at the lower flange 26 side of the resin ring 112 surface-contacts the outer side portion in the radius direction with respect to the recessed portion 134 at the upper surface of the lower flange 26.

Between the positioning portion 136 and the positioning portion 136, a recessed engaging groove 138 is formed. In the engaging groove 138, an engaging protruding portion 140 positioned between the step portion 132 and the step portion 132 of the hub 22 can be fitted.

On an inner side of the recessed portion 134, plural lower arc ribs 146 are formed to stand along a circumferential direction of the recessed portion 134 so that the hub 22 can be fitted over (at the outer side of) the lower arc ribs 146. The lower arc ribs 146 are formed intermittently so as not to interfere with the gate ribs 116 formed on the hub 22 and the gate rib 116 can be disposed between the adjacent lower arc rib 146 and lower arc rib 146.

By fitting the hub 22 over the lower arc ribs 146 and fitting the step portions 132 of the hub 22 with the positioning portions 136 of the lower flange 26 (fitting the engaging protruding portions 140 of the hub 22 into the engaging grooves 138 of the lower flange 26), the hub 22 is positioned with respect to the lower flange 26 while prevented from rotating.

In the upper end portion of the hub 22, notch portions 128 (of widths of about 4 mm) at which an upper end portion of the metal ring 110 exposes are formed parallel to an axis of the hub 22 and coaxially with the engaging protruding portions 140. By providing the notch portions 128 in this manner, protruding portions 130 formed to protrude from a movable-side retainer plate 118A forming the metal mold 118 come in contact with portions of the upper end portion of the metal ring 110 which portions correspond to the notch portions 128, in mold clamping of the metal mold 118 as shown in FIG. 9.

In other words, the protruding portions 130 of the movable-side retainer plate 118A come in contact with the upper end portion of the metal ring 110 and a bottom portion of a fixed-side retainer plate 118B forming the metal mold 118 comes in contact with the lower end portion of the metal ring 110. Therefore, even if the metal ring 110 receives pressure by resin during injection molding, the metal ring 110 is restricted in its movement, positional displacement of the metal ring 110 can be prevented, and deformation of the metal ring 110 can be prevented.

Here, as shown in FIG. 4, the notch portion 128 is positioned at a substantially central portion between the adjacent gate ribs 116. Because flows of resin from the adjacent gates 116A merge with each other at the substantially central portion between the adjacent gate ribs 116, a so-called "weld" is generated (which is formed by molten resins joining each other). Therefore, by forming the notch portions 128 in the end face of the hub 22 where welds are generated, it is possible to reduce variations in dimensions of the hub 22 in a height direction.

On the other hand, as shown in FIGS. 4 and 6 (engaging gears 48 are not shown in FIG. 6), arc-shaped upper arc ribs 148 hang down from an inner edge portion of the upper flange 24 to correspond to the lower arc ribs 146. Protruding chips 150 are formed to protrude from base portions of the upper arc ribs 148 and can be engaged with the notch portions 128 formed in the upper end portion of the hub 22.

Here, at a central portion of an end face of the lower arc rib 146, welding rib 152 having a triangular shape in a cross sectional view is formed to protrude along a circumferential direction of the lower arc rib 146. When the welding rib 152 is welded (melted) by ultrasonic welding or the like with the upper arc rib 148 in contact with the welding rib 152, the upper arc rib 148 is welded to the lower arc rib 146 (welded portion 152A) as shown in FIG. 7. As a result, the hub 22 is restricted in its movement while sandwiched between the upper flange 24 and the lower flange 26.

In the above manner, the upper flange 24, the lower flange 26, and the hub 22 are integrated with each other while they are disposed coaxially. Then, the magnetic tape T is wound around the outer peripheral face of the hub 22 and the lower flange 26 and the upper flange 24 restrict widthwise (axial direction of the hub 22) positional displacement of the magnetic tape T wound around the hub 22.

Further, a reel gear 44 is formed into an annular shape at the bottom surface of a central portion of a lower flange 26. A gear opening 40 is provided in the central portion of the bottom casing 16 in order to expose the reel gear 44 to the exterior. The reel gear 44 exposed from this gear opening 40 is engaged and rotatably driven with a drive gear 102 formed at a rotation shaft 100 of the drive device (see FIG. 10), whereby the reel 20 can be rotated relative to the casing 12 inside the casing 12.

An annular reel plate 46 made from a magnetic material is fixed by a process such as insert forming at the inner sides of the reel gear 44 in the diameter direction thereof at the bottom surface of the central portion of the lower flange 26, and is attached and retained by the magnetic force of a circular magnet (not shown) provided at the rotation shaft 100 of the drive device. Furthermore, the reel 20 is retained by a play-restricting wall 42 so as not to shake. The play-restricting wall 42 is provided so as to partially protrude toward the inner surfaces of each of the top casing 14 and the bottom casing 16, and acts as an inner wall on a circular track that is coaxial with the gear opening 40.

Further, an opening 18 is formed in a right wall 12B of the casing 12 for pulling out the recording tape T wound around the reel 20. A leader pin 30 is fixed to the free end of the recording tape T pulled out from the opening 18 while being maneuvered so as to be pulled out by a pull-out component of the drive device to which the leader pin 30 is latched (i.e., engaged).

Circular grooves 32 are formed at both ends of the leader pin 30 that protrude in the widthwise directions of the recording tape T, and these circular groove 32 are latched to a component such as a hook of the pull-out component. Due to this configuration, the hook and the like do not touch or damage the recording tape T when pulling out the recording tape T.

Further, as shown in FIGS. 2 and 3, a pair of upper and lower pin-retaining portions 36 that position and retain the leader pin 30 are provided at the inner side of the opening 18 in the casing 12, that is, in the inner surfaces of the top panel 14A of the top casing 14 and the bottom panel 16A of the bottom casing 16. These pin-retaining portions 36 are formed into approximate semi-circle shapes open to the side from which the recording tape T is pulled out, and end portions 34 of the leader pin 30 are made so as to be insertable and removable from the open sides of the pin-retaining portions 36 when the leader pin 30 is in an upright state.

A board spring 38 is also fixed and arranged in the vicinity of the pin-retaining portions 36. The tips of the fork-shaped board spring 38 engage with each of the upper and lower end portions 34 and are made to retain the leader pin 30 in the pin-retaining portions 36. It should be noted that the board spring 38 is configured so that the ends elastically deform as needed when the leader pin 30 is inserted and removed from the pin-retaining portions 36 so as to allow movement of the leader pin 30.

Further, the opening 18 is opened and closed with a door 50. The door 50 is formed into a substantially rectangular board shape having a size that can seal the opening 18. Grooves 64 are formed in the top panel 14A and the bottom panel 16A at the inner sides of the opening 18 along the right wall 12B of the casing 12. The grooves are formed such that the upper and lower ends of the door 50 can be fit therein and slid so the door 50 can move.

A shaft 52 is also provided so as to protrude at the center of the rear end portion of the door 50, and a coil spring 58 is inserted and fit onto this shaft 52. A support plate 60 having a latching portion 62 that latches the rear end of the coil spring 58 inserted and fit on the shaft 52 is also provided so as to protrude from the bottom casing 16.

Accordingly, the door 50 is configured so that the shaft 52 is supported to be fully slidable on the support plate 60 and the rear end of the coil spring 58 is latched to the latching portion 62, whereby the door 50 is always biased towards the closed direction of the opening 18 by the biasing force of the coil spring 58. It should be noted that it is preferable to further provide a support plate 66 so as to protrude, which supports the shaft 52 at the rear end side of the support plate 60 for when the opening 18 is open.

A protrusion 56 for operation of opening and closing is provided at the front end portion of the door 50 so as to protrude towards the exterior. This protrusion 56 is designed to engage with an opening/closing component (not shown) on the drive device side with the loading of the recording tape cartridge 10 to the drive device. Due to this, the door 50 is configured to resist the biasing force of the coil spring 58 and be open.

Further, a write-protect 70 set to make recording to the recording tape T possible or impossible is provided so as to be slidable in the left and right directions at the left rear portion of the casing 12. A hole 68 through which a manual switch 72 protrudes for manually operating this write-protect 70 is formed in the rear wall of the casing 12. This hole 68 is configured to be formed from a notch 68A formed from the peripheral wall 14B and top casing 14 and a notch 68B formed from the peripheral wall 16B of the bottom casing 16 when the top casing 14 and the bottom casing 16 are joined.

Furthermore, a long hole 69 through which a protrusion 74 of the write-protect 70 is exposed is provided in the bottom casing 16 along the left and right directions. The position of the write-protect 70 is detected at the drive device side when the recording tape cartridge 10 is loaded into the drive device so as to automatically determine whether recording to the recording tape T is possible or not. It should be noted that this protrusion 74 does not protrude from the bottom surface of the bottom casing 16.

Further, as shown in FIGS. 2 and 4, multiple engaging gears 48 (e.g., three at intervals of 120°) are provided so as to stand inside the lower circular arc rib 146 in the central portion of the lower flange 26 and to be separated at preset intervals. Multiple through-holes 29 (in this case, three at intervals of 120°) are provided at preset positions on the reel gear 44 between these engaging gears 48. A circular disc brake component 80 formed from a resin material is provided so as to be inserted at the interior of the reel hub 22.

As shown in FIGS. 2 and 3, brake gears 84 that can engage with the engaging gears 48 are formed in a circle on the peripheral edge of a bottom surface 80A of the brake component 80. Rotation-restricting ribs 76 formed in a cross shape when viewed as a planar surface are provided on the upper surface of the brake component 80 so as to protrude from the inner surface of the top panel 14A of the top casing 14 towards the downward side. The rotation-restricting ribs 76 are inserted into the interior of engaging protrusions 86 that also have a cross shape when viewed as a planar surface, and the height of the engaging protrusions 86 are provided to stand slightly taller than the height of the rotation-restricting ribs 76. Due to this, the brake component 80 cannot be rotated relative to the casing 12 (i.e., the top casing 14) but it is movable in the up and down directions inside the reel hub 22.

A compressed coil spring 98 is also arranged between the top casing 14 and the brake component 80. That is, one end of the compressed coil spring 98 comes into contact with the inner side of a circular protrusion 78 arranged so as to protrude towards the exterior side of the rotation-restricting ribs 76 of the top casing 14 (i.e., between the rotation-restricting ribs 76 and the circular protrusion 78) and the other end is arranged in a state where it is in contact with the inside of an annular groove 88 provided on the upper surface of the brake component 80. The brake component 80 is usually biased downwards due to the biasing force of this compressed coil spring 98.

Accordingly, the brake gears 84 are usually in state where they are engaged with the engaging gears 48 when the recording tape cartridge 10 is not in use (i.e., when the tape is not loaded into a drive device) and is in a state of rotational lock where the gears are blocked from rotating relative to the casing 12 of the reel 20. It should be noted that at this time, the reel 20 is pressed towards the bottom casing 16 side by this biasing force and this exposes the reel gear 44 from the gear opening 40.

A releasing component 90 made from a resin material that appears as substantially triangularly-shaped when viewed as a planar surface is also inserted and provided at the interior of the reel hub 22 and the underside of the brake component 80 (i.e., between the central portion of the lower flange 26 and the brake component 80). As shown in FIG. 4, through-holes 92 having preset shapes are provided at the positions corresponding to the triangle-shaped tip portions and these are designed to lighten the releasing component 90.

Here, as shown in FIGS. 5 and 8, an outside shape of the releasing component 90 is formed to be larger than an inside diameter of the lower arc ribs 146 and a clearance portion 146A for avoiding interference with a top portion of the releasing component 90 is formed in an inner face of each of the lower arc ribs 146 along a standing direction of the lower arc rib 146.

Further, legs 94 are provided at the bottom surface of the releasing component 90 at each tip portion thereof. The legs 94 are inserted through the through-holes 29 from the bottom surface of the central portion of the lower flange 26 to protrude at preset heights on the reel gear 44 (see FIG. 3). A substantially semi-spherical releasing protrusion 82 that protrudes from the center of the bottom surface 80A of the brake component 80 is made to contact in the central portion that is the flat surface of the releasing component 90 (see FIG. 3).

By configuring the invention in this manner, the contact area of the brake component 80 and the releasing component 90 is reduced as much as possible, and the sliding resistance during use (i.e., when the reel 20 is rotated) is made to be lightened as much as possible. It should be noted that, for example, polyacetal (POM) can be used for the material for the brake component 80 and polybuthylene terephthalete (PBT) can be used for the material of the releasing component 90. Further, a load of, for example, 4.2 N is placed on the releasing component 90 due to the biasing force of the compressed coil spring 98 from the brake component 80 side.

Next, the operation of the recording tape cartridge 10 designed as described above will be explained.

With the recording tape cartridge 10 configured as described above, the opening 18 is closed with the door 50 when the device is not in use (e.g., during storage, transport, etc.). Also, the recording tape T is wound around the reel hub 22 of the reel 20.

When using the recording tape T, a front wall 12A acts as the front and the recording tape cartridge 10 is loaded into the drive device along the direction of the A arrow. Once this occurs, firstly, the opening/closing component (not shown) provided at the drive device side engages with the protrusion 56 of the door 50. Then, in this state, when the recording tape cartridge 10 moves further in the direction of the A arrow, the opening/closing component makes the protrusion 56 resist the biasing force of the coil spring 58 while making it move relatively towards the rear. When this happens, the door 50 on which the protrusion 56 is provided so as to protrude slides towards the rear side in the grooves 64 along the right wall 12B and opens the opening 18.

In this manner, when the recording tape cartridge 10 is loaded into the drive device by a preset depth and the opening 18 opens completely, the recording tape cartridge 10 descends by a preset height and a positioning component (not shown) of the drive device is inserted into a positioning hole (not shown) formed in the bottom casing 16. Due to this, the recording tape cartridge 10 is precisely positioned inside the drive device and further sliding of the door 50 (i.e., movement towards the rear) is restricted.

Figure 10:
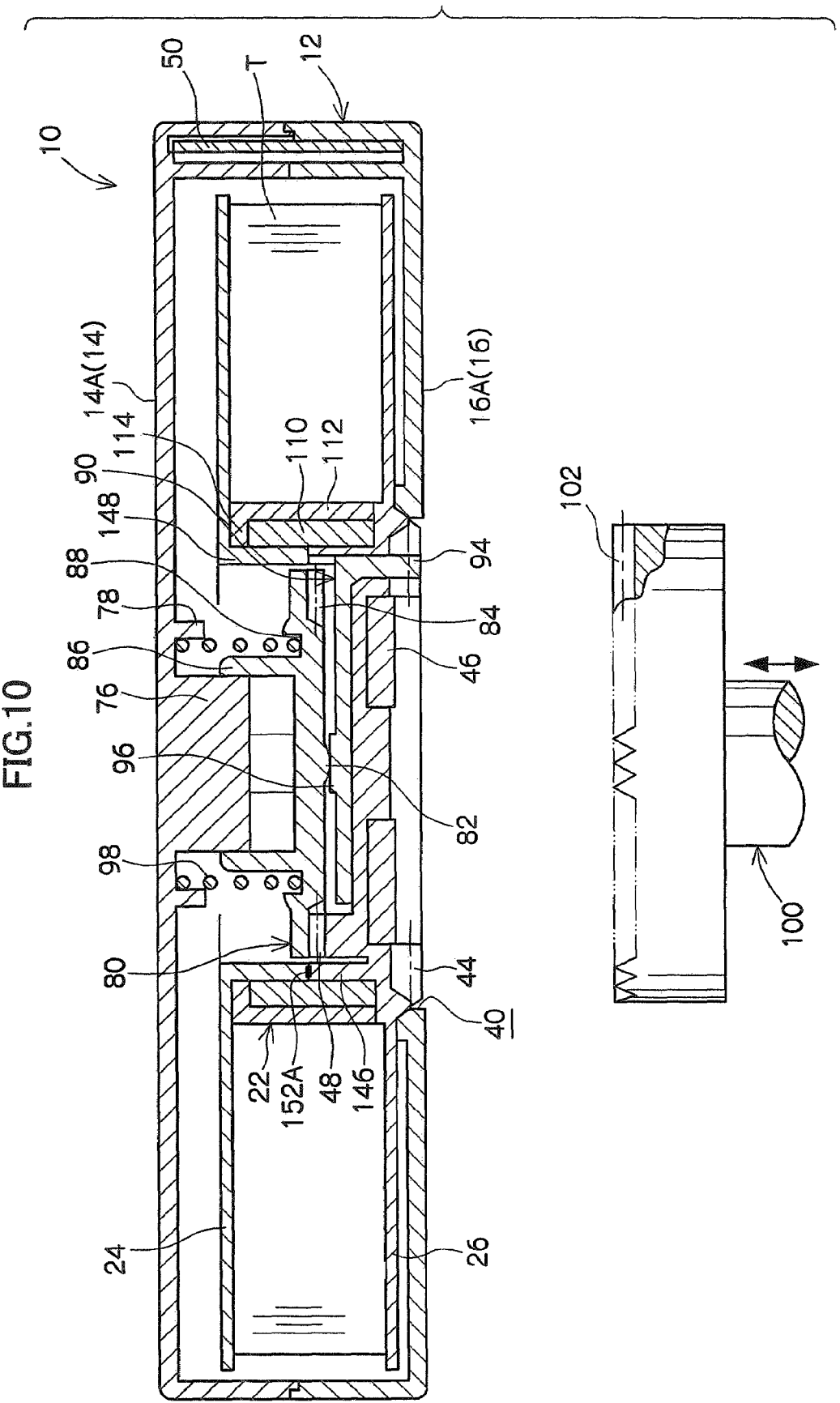
FIG. 10 shows a schematic side sectional view of the recording tape cartridge before engagement of a drive gear of a rotation shaft.
Figure 11:
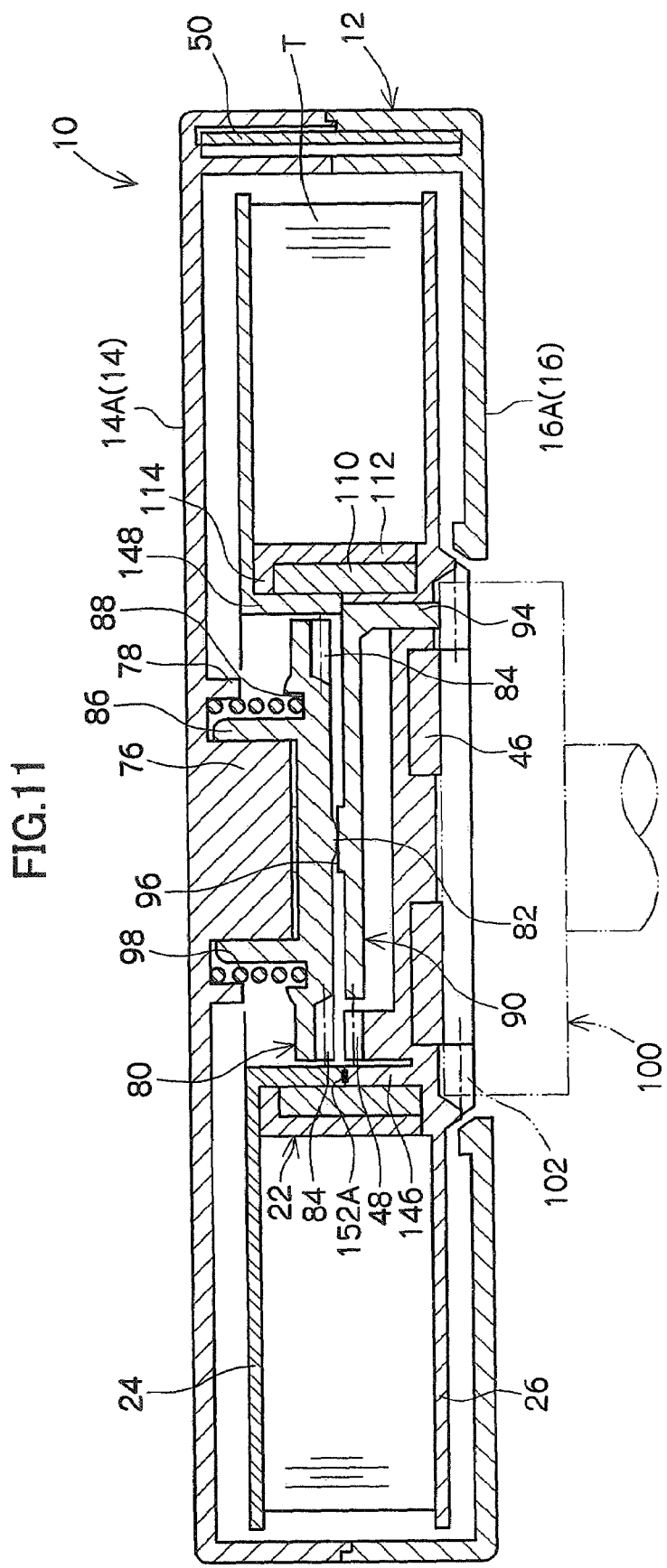
FIG. 11 shows a schematic side sectional view of the recording tape cartridge after engagement of the drive gear of the rotation shaft.

Further, as shown in FIGS. 10 and 11, the rotation shaft 100 approaches from the gear opening 40 relative with the descending movement of the recording tape cartridge 10 and makes the drive gear 102 engage with the reel gear 44. Once this occurs, the legs 94 protruding from the top of the reel gear 44 resist the biasing force of the compressed coil spring 98. The brake component 80 is pressed upwards via the releasing component 90, and engagement of the brake gears 84 and the engaging gears 48 is released.

Then, when the drive gear 102 and the reel gear 44 are in a state of complete engagement, the reel plate 46 is adhered and retained by the magnetic force of a circular magnet (not shown) provided at the inner side of the drive gear 102, whereby engaging of the reel gear 44 to the drive gear 102 is maintained while the reel 20 inside the casing 12 is placed in a state of lock release whereby rotation of the reel 20 relative to the casing 12 becomes possible (see FIG. 11).

Meanwhile, a pull-out component (not shown) provided at the drive device approaches the interior of the casing 12 from the opened opening 18 and grasps the leader pin 30 positioned and retained by the pin-retaining portions 36 as shown in FIG. 1. It should be noted that at this time, the recording tape cartridge 10 is precisely positioned inside the drive device so the pull-out component can latch its hooks to the circular grooves 32 of the leader pin 30 with certainty. Further, the state of rotational lock of the reel 20 is released so the reel 20 can rotate with the pulling out action of the leader pin 30.

In this manner, the leader pin 30 removed from the opening 18 is accommodated on a wind-up reel (not shown). Then the wind-up reel and the reel 20 are driven and rotated at the same time, whereby the recording tape T is taken up on the wind-up reel while being gradually pulled out from the casing 12. Recording and playback of data is performed with a recording/playback head (not shown) arranged along a preset tape route.

When the recording tape cartridge 10 in which recording or playback of data has been completed is ejected from the drive device, first the rotation shaft 100 rotates in the opposite direction, whereby the recording tape T is rewound to the reel 20. Then the recording tape T is rewound until the end onto the reel 20 and the leader pin 30 is retained by the pin-retaining portions 36, whereby the recording tape cartridge 10 rises by a preset height. A positioning component (not shown) is removed from the positioning hole (not shown) while the rotation shaft 100 is removed from the gear opening 40 and the engaging of the drive gear 102 relative to the reel gear 44 is released.

Once this happens, the brake component 80 and the releasing component 90 are pressed downwards with the biasing force of the compressed coil spring 98 and the legs 94 are inserted through the through-holes 29 and while the legs 94 protrude to a preset height on the reel gear 44 from the bottom surface of the central portion of the lower flange 26, the brake gears 84 engage with the engaging gears 48. Due to this, the reel 20 enters a state of rotational lock where consequent relative rotation inside the casing 12 is blocked (see FIG. 10), after which the recording tape cartridge 10 is moved in the direction opposite the direction of the A arrow with an ejection mechanism (not shown).

When this happens, the door 50 slides with this movement in the closed direction of the opening 18 with the biasing force of the coil spring 58 and the opening 18 closes completely (i.e., returns to its original state). In this manner, relative rotation of the reel 20 with the casing 12 is locked and the recording tape cartridge 10, whose opening 18 is closed, is completely ejected from inside the drive device.

By the way, in the invention, as shown in FIGS. 4 and 5, the resin ring 112 is formed integrally with the outer peripheral face of the metal ring 110 to thereby form the hub 22. The upper end portion of the metal ring 110 is covered with the resin portion 114 contiguous with the resin ring 112. On the lower end portion side of the resin ring 112, the step portions 132 exposing the metal ring 110 are formed intermittently along the circumferential direction of the resin ring 112.

The substantially circular cylindrical recessed portion 134 is formed at a central portion of the lower flange 26 in a concentric circle manner. The positioning portions 136 with which the step portions 132 of the hub 22 can be fitted respectively are provided as "mount portions" at step portions between the recessed portion 134 and an outer side portion in a radius direction with respect to the recessed portion 134 at the upper surface of the lower flange 26 (that is, the step portions is in the vicinity of outer peripheral portions of the recessed portion 134). The lower face of the one end portion at the lower flange 26 side of the resin ring 112 surface-contacts the outer side portion in the radius direction with respect to the recessed portion 134 at the upper surface of the lower flange 26.

Figure 12A:
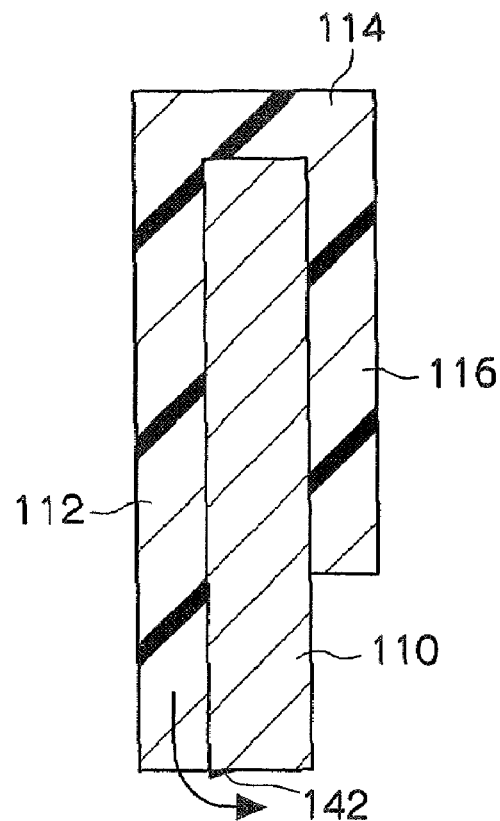
FIG. 12B shows an explanatory view for explaining the gist of the hub of the reel according to the exemplary embodiment of the invention and FIG. 12A shows a comparative example of FIG. 12B.

In integrally molding the metal ring 110 and the resin ring 112, if a minute gap exists between the metal ring 110 and the metal mold 118 in molding, fluid resin from a space of the metal mold for molding the resin ring 112 may flow into the gap to thereby produce a resin burr 142 on the end face of the metal ring 110 as shown in FIG. 12A.

Figure 12B:
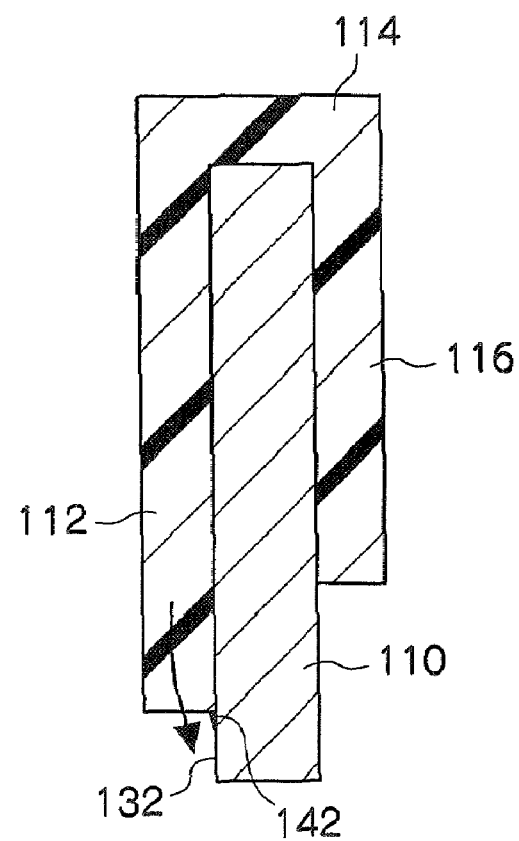

However, by forming the step portion 132 exposing the metal ring 110 at the side of the lower end portion of the resin ring 112, positions in the height direction of the lower end face of the resin ring 112 and the lower end face of the metal ring 110 are displaced from each other as shown in FIG. 12B.

Therefore, even if the minute gap exists between the metal ring 110 and the metal mold 118 and the fluid resin leaks into the gap to produce the resin burr 142 as shown in FIG. 12B, the burr 142 does not reach the lower end face of the metal ring 110. In other words, variations due to the burr do not occur in the lower end face of the hub 22 for positioning in dimension of the product.

Figure 13A:
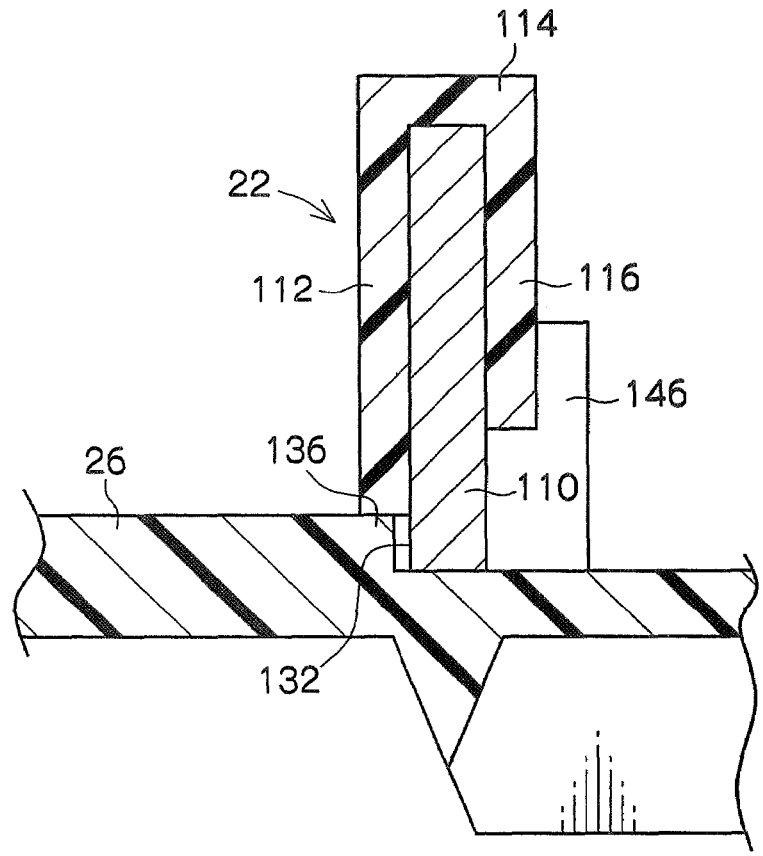
FIG. 13A shows a sectional view showing an A-A section in FIG. 4
Figure 13B:
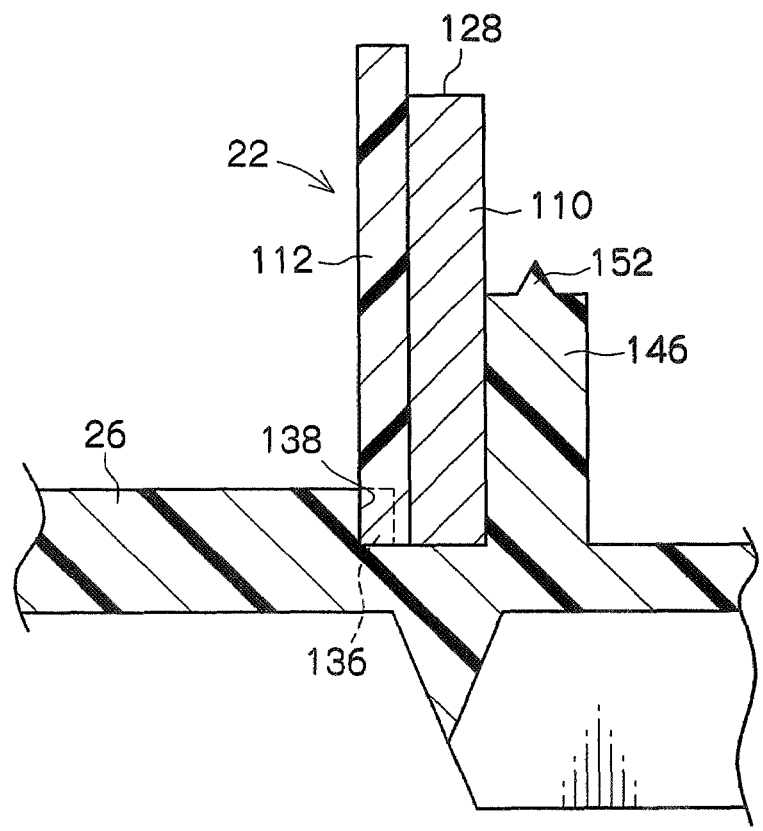
FIG. 13B shows a sectional view showing a B-B section in FIG. 4.

Furthermore, the positioning portions 136 are provided intermittently on the same circle circumference at the lower flange 26, the positioning portions 136 are fitted in the step portions 132, and the lower face of the one end portion at the lower flange 26 side of the resin ring 112 can surface-contact the outer side portion in the radius direction with respect to the recessed portion 134 at the upper surface of the lower flange 26 as shown in FIGS. 13A and 13B (FIG. 13A is a sectional view showing an A-A section in FIG. 4 and FIG. 13B is a sectional view showing a B-B section in FIG. 4).

As a result, in the assembled reel, the step portions 132 do not exist seemingly on the surface (the outer periphery) of the hub 22. In other words, a face to be wound with the magnetic tape T (see FIG. 2) is flat so as not to affect the magnetic tape T to be wound.

Figure 14:
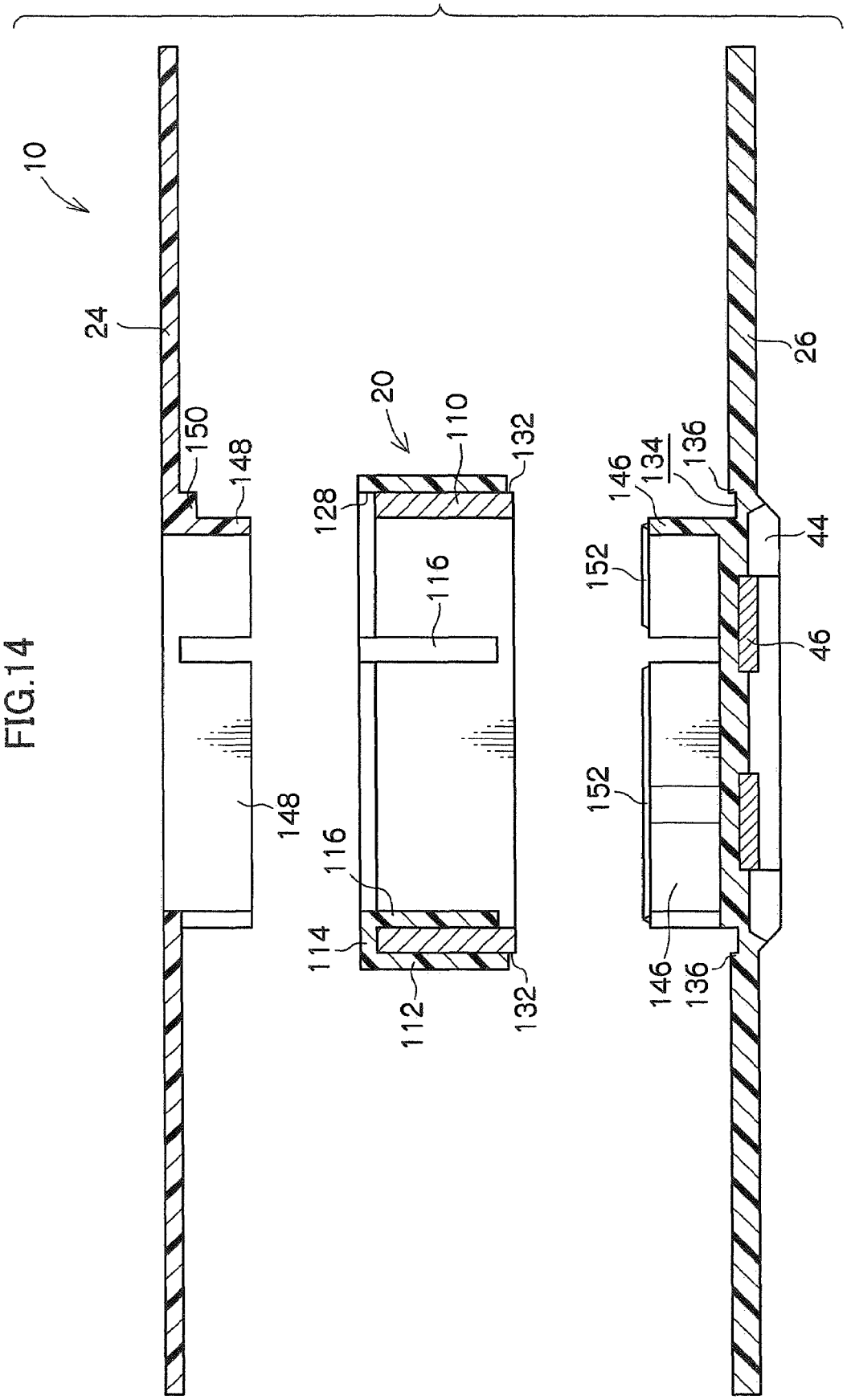
FIG. 14 shows a schematic exploded sectional view of the reel according to another exemplary embodiment of the invention.

Here, by intermittently providing the step portions 132 of the hub 22 and the positioning portions 136 of the lower flange 26 along the circumferential direction, they also perform a function of preventing rotation of the hub 22 with respect to the lower flange 26 as shown in FIG. 4. However, for the purpose of further preventing the fluid resin from reaching the lower end face of the metal ring 110, it is preferable to provide the step portion 132 throughout the circumference of the hub 22 as shown in FIG. 14. In this case, members for preventing rotation of the hub 22 are provided in other positions such as the inner peripheral face side of the hub 22.

Moreover, in the present exemplary embodiment, the upper arc ribs 148 and the lower arc ribs 146 are provided on the inner peripheral face side of the hub 22 as shown in FIGS. 4 and 6 and the upper arc ribs 148 of the upper flange 24 are welded to the end faces of the lower arc ribs 146 of the lower flange 26 (welded portions 152A) as shown in FIG. 7 to sandwich the hub 22 between the upper flange 24 and the lower flange 26.

In other words, because the hub 22 is not directly welded to the upper flange 24 and the lower flange 26, it is possible to prevent transmission of a winding and tightening force of the magnetic tape T acting on the hub 22 to the upper flange 24 and the lower flange 26. As a result, it is possible to prevent deformation of the upper flange 24 and the lower flange 26.

Although the aluminum metal ring 110 having the wall thickness of about 1.25 mm is used as the reinforcing ring in the exemplary embodiment, the wall thickness is not limited to it because it is essential only that the ring can increase rigidity of the hub 22. Material of the reinforcing ring is also not limited to it and non-metal material may be used. However, if material such as aluminum having corrosivity is used for the reinforcing ring, it is preferable to use the reinforcing ring with its surface subjected to corrosion control treatment such as plating. The materials of the resin rings 112 is not limited to PC but may be other resin materials adaptable to injection molding.

Although an example in which the reel 20 is applied to the recording tape cartridge 10 configured by housing the single reel in the casing 14 has been shown in the above exemplary embodiment, the invention is not limited to it. For example, the reel 20 may be applied to a two-reel recording tape cartridge configured by housing two reels in a casing.

What is claimed is:

1. A reel comprising:
   a hub on which a recording tape is wound;
   an upper flange provided at one end portion of the hub so as to hold one widthwise end portion of the recording tape; and
   a lower flange provided at the other end portion of the hub so as to hold the other widthwise end portion of the recording tape in cooperation with the upper flange,
   wherein:
   the hub is structured to include a tube shaped reinforcing ring and a resin ring integrally formed on an outer peripheral face of the reinforcing ring,
   a step portion is formed along a circumferential direction between a lower face of one end portion at the lower flange side of the resin ring and a lower face of one end portion at the lower flange side of the reinforcing ring so as to expose the reinforcing ring, and
   a mount portion is formed along the circumferential direction at the lower flange such that the step portion is able to fit with the mount portion.

2. The reel of claim 1, wherein the step portions are provided intermittently along the circumferential direction, and the mount portions are provided intermittently along the circumferential direction.

3. The reel of claim 2, wherein an engaging portion is provided between the step portions that are adjacent to each other along the circumferential direction, and a groove portion which is able to fit with the corresponding engaging portion is formed between the mount portions that are adjacent to each other along the circumferential direction.

4. The reel of claim, 1 further comprising:
   a plurality of lower ribs formed to stand on an upper face of the lower flange, and arranged along the circumferential direction, the hub being able to fit over the lower ribs; and
   a plurality of upper ribs hanging down from a lower face of the upper flange to correspond to the lower ribs, and arranged along the circumferential direction, the hub being able to fit over the upper ribs,
   wherein end faces of the lower ribs and end faces of the upper ribs are welded so as to sandwich the hub between the upper flange and the lower flange.

5. The reel of claim 1, wherein a connection portion which covers an end portion at the upper flange side of the reinforcing ring and is continuous to the resin ring is provided, and a rib which is continuous to the connection portion is formed on an inner peripheral face of the reinforcing ring.

6. The reel of claim 1, wherein the step portion is provided along the circumferential direction throughout the circumference of the hub, and the mount portion is provided along the circumferential direction throughout the circumference of the hub.

7. The reel of claim 1, wherein the mount portion is provided by forming a concave portion on an upper surface of the lower flange.

8. The reel of claim 7, wherein the lower face of the one end portion at the lower flange side of the resin ring surface-contacts the lower flange at an outer side portion in a radius direction with respect to the concave portion at the upper surface of the lower flange.

9. The reel of claim 1, wherein the step portion is formed by positioning the lower face of the one end portion at the lower flange side of the resin ring further toward the upper flange side than the lower face of the one end portion at the lower flange side of the reinforcing ring.

10. A recording tape cartridge comprising a reel and a case that accommodates the reel, the reel including:
    a hub on which a recording tape is wound;
    an upper flange provided at one end portion of the hub so as to hold one widthwise end portion of the recording tape; and
    a lower flange provided at the other end portion of the hub so as to hold the other widthwise end portion of the recording tape in cooperation with the upper flange,
    the hub being structured to include a tube shaped reinforcing ring and a resin ring integrally formed on an outer peripheral face of the reinforcing ring,
    a step portion being formed along a circumferential direction between a lower face of one end portion at the lower flange side of the resin ring and a lower face of one end portion at the lower flange side of the reinforcing ring so as to expose the reinforcing ring, and
    a mount portion being formed along the circumferential direction at the lower flange such that the step portion is able to fit with the mount portion.

* * * * *